(12) United States Patent
Chen et al.

(10) Patent No.: US 7,646,463 B2
(45) Date of Patent: Jan. 12, 2010

(54) PIXEL STRUCTURE AND MANUFACTURING METHOD OF LIQUID CRYSTAL DISPLAY PANEL HAVING THE SAME

(75) Inventors: Chieh-Wei Chen, Hsinchu (TW); Cheng-Han Tsao, Hsinchu (TW); Jenn-Jia Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 135 days.

(21) Appl. No.: 12/040,923

(22) Filed: Mar. 3, 2008

(65) Prior Publication Data

US 2009/0103033 A1    Apr. 23, 2009

(30) Foreign Application Priority Data

Oct. 18, 2007  (TW) ............................. 96139011 A (51) Int. Cl.
*G02F 1/1343* (2006.01)
(52) U.S. Cl. .................. 349/141; 349/142; 349/146
(58) Field of Classification Search .............. 349/141, 349/142, 146
See application file for complete search history.

(56) References Cited

U.S. PATENT DOCUMENTS 7,518,684 B2 * 4/2009 Huang et al. ............... 349/129
2007/0103607 A1 5/2007 Hanaoka et al.

* cited by examiner

*Primary Examiner*—David Nelms
*Assistant Examiner*—Phu Vu
(74) *Attorney, Agent, or Firm*—Jianq Chyun IP Office (57) ABSTRACT

A pixel structure including a first active device, a second active device, a first pixel electrode electrically connecting the first active device, a second pixel electrode electrically connecting the second active device and a first capacitance lower electrode is provided. Both the first active device and the second active device electrically connect a scan line and a data line. The first pixel electrode has a first interlacing pattern and first stripe patterns connected thereto. The second pixel electrode has a second interlacing pattern and second stripe patterns connected thereto. The first capacitance lower electrode located under the first interlacing pattern has a first region and second regions. The first pixel electrode substantially shields the first region but does not shield the second regions. An area ratio of the first region to the second regions is about 10:1~300:1.

21 Claims, 6 Drawing Sheets

PIXEL STRUCTURE AND MANUFACTURING METHOD OF LIQUID CRYSTAL DISPLAY PANEL HAVING THE SAME

CROSS-REFERENCE TO RELATED APPLICATION

This application claims the priority benefit of Taiwan application serial no. 96139011, filed on Oct. 18, 2007. The entirety the above-mentioned patent application is hereby incorporated by reference herein and made a part of specification.

BACKGROUND OF THE INVENTION

1. Field of the Invention

The present invention relates to a pixel structure and a manufacturing method of a liquid crystal display (LCD) panel having the pixel structure, and more particularly to a pixel structure in which liquid crystal molecules form a multi-domain alignment and a manufacturing method of the LCD panel having the pixel structure.

2. Description of Related Art

LCDs characterized by high contrast ratio, no gray scale inversion, little color shift, high luminance, full color, desirable color saturation, high responsive speed, and wide viewing angles are required in the market. At this current stage, some display panels, such as twisted nematic (TN) LCD panels equipped with wide viewing films, in-plane switching (IPS) display panels, fringe field switching display panels and multi-domain vertical alignment (MVA) display panels, have been developed to satisfy the requirement for the wide viewing angles.

Conventionally, the MVA-LCD panel has an alignment structure, such that liquid crystal molecules in different pixel regions have different tilt angles, accomplishing a wide-viewing-angle effect. The alignment structures include alignment protrusions and alignment slits disposed on electrodes. However, light leakage caused from disclination of a tilting direction of the liquid crystal molecules surrounding the alignment protrusions and the alignment slits frequently leads to a reduction of the contrast ratio of the LCD panel. To avoid the light leakage, a light shielding layer corresponding to the alignment protrusions or the alignment slits is often disposed. Nevertheless, an aperture ratio of the display is limited thereby. Hence, polymer-stabilized alignment (PSA) aiming at forming multi-domain alignment has been proposed, so as to resolve the issue regarding the unfavorable contrast ratio of the MVA-LCD panel.

A process of achieving the PSA includes doping reactive monomers into a liquid crystal layer and applying a specific voltage thereto. Next, the liquid crystal layer is irradiated by a light beam or a thermal source under said voltage, and thereby the reactive monomers are polymerized and cured, such that a stabilizing layer is formed simultaneously on a substrate at respective sides of the liquid crystal layer. Here, the stabilizing layer is arranged to conducive to tilting or arranging the liquid crystal molecules in different directions, so as to achieve the wide-viewing-angle effect. Since the disposition of the stabilizing layer does not result in the light leakage of the LCD panel, the contrast ratio of the LCD panel can be increased. Nevertheless, unfortunately, the process of achieving the PSA often gives rise to certain defects, thus bringing about undesired tilting of parts of the liquid crystal molecules. Therefore, further improvement in this regard is deemed necessary.

SUMMARY OF THE INVENTION

The present invention is directed to a pixel structure for resolving an issue with respect to undesired tilting of liquid crystal molecules in a conventional PSA pixel structure.

The present invention is further directed to a manufacturing method of an LCD panel, so as to fabricate a desired MVA-LCD panel in which liquid crystal molecules are arranged in a satisfactory direction.

The present invention provides a pixel structure electrically connecting a scan line and a data line. The pixel structure includes a first active device, a second active device, a first pixel electrode electrically connecting the first active device, a second pixel electrode electrically connecting the second active device, and a first capacitance lower electrode. Both the first active device and the second active device electrically connect the scan line and the data line. The first pixel electrode has a first interlacing pattern and a plurality of first stripe patterns connected to the first interlacing pattern. The second pixel electrode has a second interlacing pattern and a plurality of second stripe patterns connected to the second interlacing pattern. The first capacitance lower electrode located under the first interlacing pattern has a first region and a plurality of second regions. The first pixel electrode substantially shields the first region but does not shield the plurality of the second regions. An area ratio of the first region to the plurality of the second regions is approximately 10:1~300:1, preferably 40:1~50:1.

According to an embodiment of the present invention, at least one of the second regions does not overlap the data line.

According to an embodiment of the present invention, a ratio of a width of the first region to a width of each of the second regions is greater than 1.01:1 but less than 50:1 in a direction perpendicular to an extending direction of the first capacitance lower electrode.

According to an embodiment of the present invention, the pixel structure further includes a first capacitance upper electrode and an insulating layer. The first capacitance upper electrode is disposed between the first pixel electrode and the first capacitance lower electrode, while the insulating layer is disposed between the first capacitance lower electrode and the first capacitance upper electrode. In addition, the first capacitance upper electrode has a first opening, for example. The first opening can be located below a center of the first interlacing pattern, so as to expose a portion of the insulating layer above the first capacitance lower electrode. The pixel structure further includes a dielectric layer disposed between the first pixel electrode and the first capacitance upper electrode. The first pixel electrode further has a second opening at least overlapping the first opening. The second opening is, for example, greater than the first opening.

According to an embodiment of the present invention, the pixel structure further includes a dielectric layer disposed between the first pixel electrode and the first capacitance lower electrode. The first pixel electrode further has a second opening exposing a portion of the dielectric layer above the first region.

According to an embodiment of the present invention, the first pixel electrode further includes a plurality of fine slits disposed between the first interlacing pattern and the first stripe patterns. One end of each of the fine slits connects the first interlacing pattern, whereas the other end thereof is away from the first interlacing pattern.

According to an embodiment of the present invention, the pixel structure further includes a second capacitance lower electrode disposed below the second interlacing pattern. The pixel structure can further include a second capacitance upper electrode disposed between the second pixel electrode and the second capacitance lower electrode.

According to an embodiment of the present invention, the second pixel electrode further includes a plurality of fine slits disposed between the second interlacing pattern and the second stripe patterns. One end of each of the fine slits connects the second interlacing pattern, whereas the other end thereof is away from the second interlacing pattern.

The present invention further provides another pixel structure electrically connecting a scan line and a data line. The pixel structure includes a first active device, a second active device, a first pixel electrode electrically connecting the first active device, a second pixel electrode electrically connecting the second active device, a first capacitance lower electrode, an insulating layer, a first capacitance upper electrode, and a dielectric layer. Both the first active device and the second active device electrically connect the scan line and the data line. The first pixel electrode has a first interlacing pattern and a plurality of first stripe patterns connected to the first interlacing pattern. On the other hand, the second pixel electrode has a second interlacing pattern and a plurality of second stripe patterns connected to the second interlacing pattern. The first capacitance lower electrode is disposed below the first interlacing pattern. The first capacitance upper electrode is disposed between the first pixel electrode and the first capacitance lower electrode. The insulating layer is disposed between the first capacitance lower electrode and the first capacitance upper electrode. The dielectric layer is disposed between the first capacitance upper electrode and the first pixel electrode. Here, the first capacitance upper electrode has a first opening located below a center of the first interlacing pattern, so as to expose a portion of the insulating layer above the first capacitance lower electrode.

According to another embodiment of the present invention, the first pixel electrode further has a second opening at least overlapping the first opening. The second opening is, for example, greater than the first opening.

According to another embodiment of the present invention, the first pixel electrode further includes a plurality of fine slits disposed between the first interlacing pattern and the first stripe patterns. One end of each of the fine slits connects the first interlacing pattern, whereas the other end thereof is away from the first interlacing pattern.

According to another embodiment of the present invention, the pixel structure further includes a second capacitance lower electrode disposed below the second interlacing pattern. The pixel structure may further include a second capacitance upper electrode disposed between the second pixel electrode and the second capacitance lower electrode.

According to another embodiment of the present invention, the second pixel electrode further includes a plurality of fine slits disposed between the second interlacing pattern and the second stripe patterns. One end of each of the fine slits connects the second interlacing pattern, whereas the other end thereof is away from the second interlacing pattern.

The present invention further provides still another pixel structure electrically connecting a scan line and a data line. The pixel structure includes a first active device, a second active device, a first pixel electrode electrically connecting the first active device, a second pixel electrode electrically connecting the second active device, a first capacitance lower electrode, and an insulating layer. Both the first active device and the second active device electrically connect the scan line and the data line. The first pixel electrode has a first interlacing pattern and a plurality of first stripe patterns connected to the first interlacing pattern. The second pixel electrode has a second interlacing pattern and second stripe patterns connected thereto. The first capacitance lower electrode is disposed below the first interlacing pattern. The insulating layer is disposed between the first capacitance lower electrode and the first pixel electrode. Here, the first pixel electrode has an opening exposing a portion of the insulating layer above the first capacitance lower electrode.

The present invention further provides a manufacturing method of an LCD panel. First, a semi-finished LCD panel is provided. The semi-finished LCD panel includes an array substrate, an opposite substrate, and a liquid crystal layer. The array substrate includes a plurality of the pixel structures described in any of the aforesaid embodiments, while the opposite substrate is disposed opposite to the array substrate. The liquid crystal layer is disposed between the array substrate and the opposite substrate, and the liquid crystal layer includes a plurality of monomers. Thereafter, a voltage difference is generated between the array substrate and the opposite substrate. Next, the monomers are polymerized.

According to still another embodiment, the step of generating the voltage difference between the array substrate and the opposite substrate includes providing a ground level to the opposite substrate and providing a first voltage to the first capacitance lower electrode. The first voltage has a positive half-cycle signal and a negative half-cycle signal, and a peak value of the positive half-cycle signal and a peak value of the negative half-cycle signal have a difference in a range of 10V~100V. The voltage difference is approximately 5V~50V.

According to still another embodiment, the step of polymerizing the monomers includes light polymerization of the monomers, thermal polymerization of the monomers, or a combination thereof.

Through changing the patterns of the capacitance lower electrode in the pixel structure of the present invention, an area of the capacitance lower electrode uncovered by other conductive layers is reduced. Therefore, the pixel structure of the present invention is conducive to reducing disclination of the tilting direction of the liquid crystal molecules when applied to the PSA LCD panel. Moreover, the opening corresponding to a center of the pixel structure can be further formed in the conductive layer above the capacitance lower electrode according to the present invention, such that the liquid crystal molecules can be arranged in an appropriate direction in the PSA process.

In order to make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
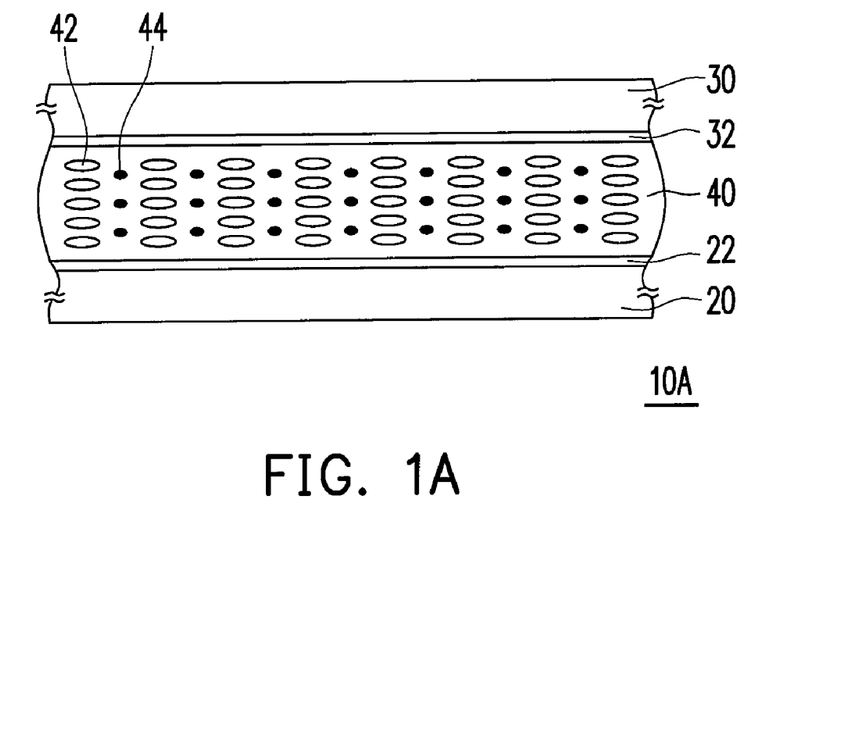
FIGS. 1A and 1B illustrate a process of manufacturing a PSA LCD panel.
Figure 1B:
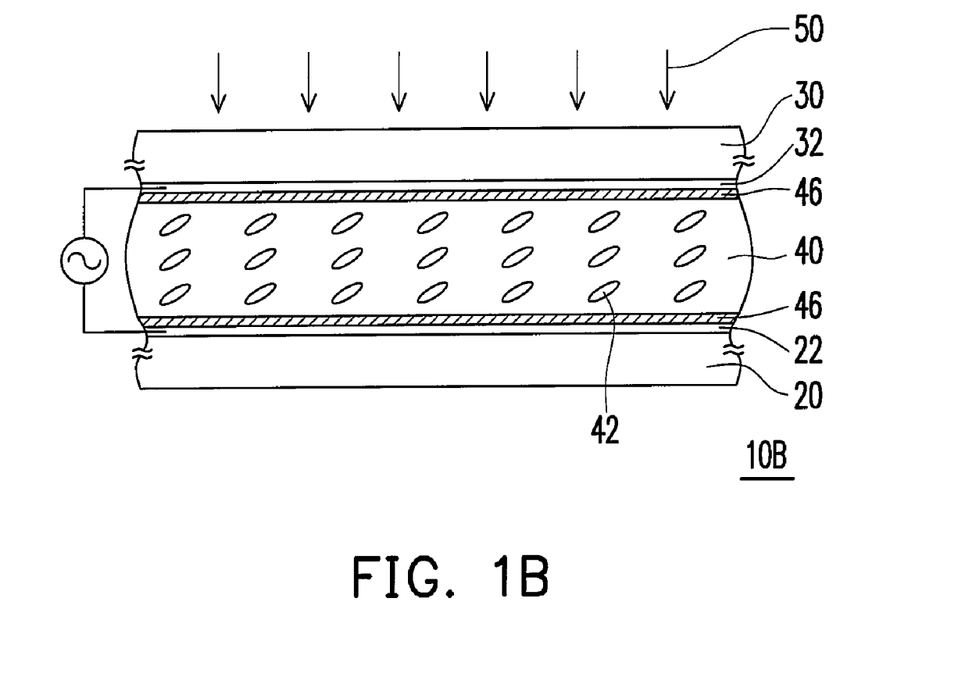

FIGS. 1A and 1B illustrate a process of manufacturing a PSA LCD panel. First, referring to FIG. 1A, a semi-finished LCD panel 10A is provided. The semi-finished LCD panel 10A includes an array substrate 20, an opposite substrate 30, and a liquid crystal layer 40. The array substrate 20 has a plurality of pixels 22. The opposite substrate 30 has an opposite electrode 32 disposed thereon. The liquid crystal layer 40 includes a plurality of liquid crystal molecules 42 and a plurality of monomers 44. Here, the monomers 44 include light polymerized monomers, thermal polymerized monomers, or a combination thereof.

Thereafter, referring to FIG. 1B, a voltage difference is generated between the array substrate 20 and the opposite substrate 30. In detail, the step of generating the voltage difference includes providing a ground level to the opposite electrode 32 of the opposite substrate 30 and providing a first voltage to an electrode layer of the pixel array 22. The first voltage has a positive half-cycle signal and a negative half-cycle signal, for example, and a peak value of the positive half-cycle signal and a peak value of the negative half-cycle signal have a difference in a range of 10V~100V. In other words, the first voltage is an alternating current (AC) voltage. The difference between the positive peak value of the AC voltage and the negative peak value thereof is in a range of 10V~100V. Moreover, in the step, the voltage difference between the array substrate 20 and the opposite substrate 30 is approximately 5V~50V. The ratio of the voltage difference to the first voltage varies upon the design of a storage capacitance and the design of a liquid crystal capacitance of the LCD panel 10B. Generally, the voltage difference in the PSA process is approximately 40%~70% of the first voltage.

Referring to FIG. 1B, the voltage difference between the array substrate 20 and the opposite substrate 30 generates an electric field in the liquid crystal layer 40. The liquid crystal molecules 42 are tilted and arranged in a direction because of the electric field. Here, a curing process is implemented to cure the monomers 44, such that the monomers 44 form a stabilizing layer 46 at an upper side of the liquid crystal layer 40 and a lower side thereof, respectively. The curing process includes providing energy 50 irradiating the monomers 44 in the liquid crystal layer 40, so as to form the stabilizing layer 46. The energy 50 may be light or heat. That is to say, the curing process may be a light curing process, a thermal curing process or a combination thereof according to properties of molecules of the monomers 44. During the formation of the stabilizing layer 46, the liquid crystal molecules 42 are affected by the direction of the electric field and are accordingly arranged in a certain manner. Thereby, the stabilizing layer 46 is formed and arranged in said manner. As such, after the PSA process is completed, the arrangement of the liquid crystal molecules 42 complies with the design requirement of the stabilizing layer 46. Namely, after the PSA process is performed, the liquid crystal molecules 42 are arranged in the multi-domain alignment, thus resulting in an improvement of the display effect of the LCD panel 10B.

Figure 2:
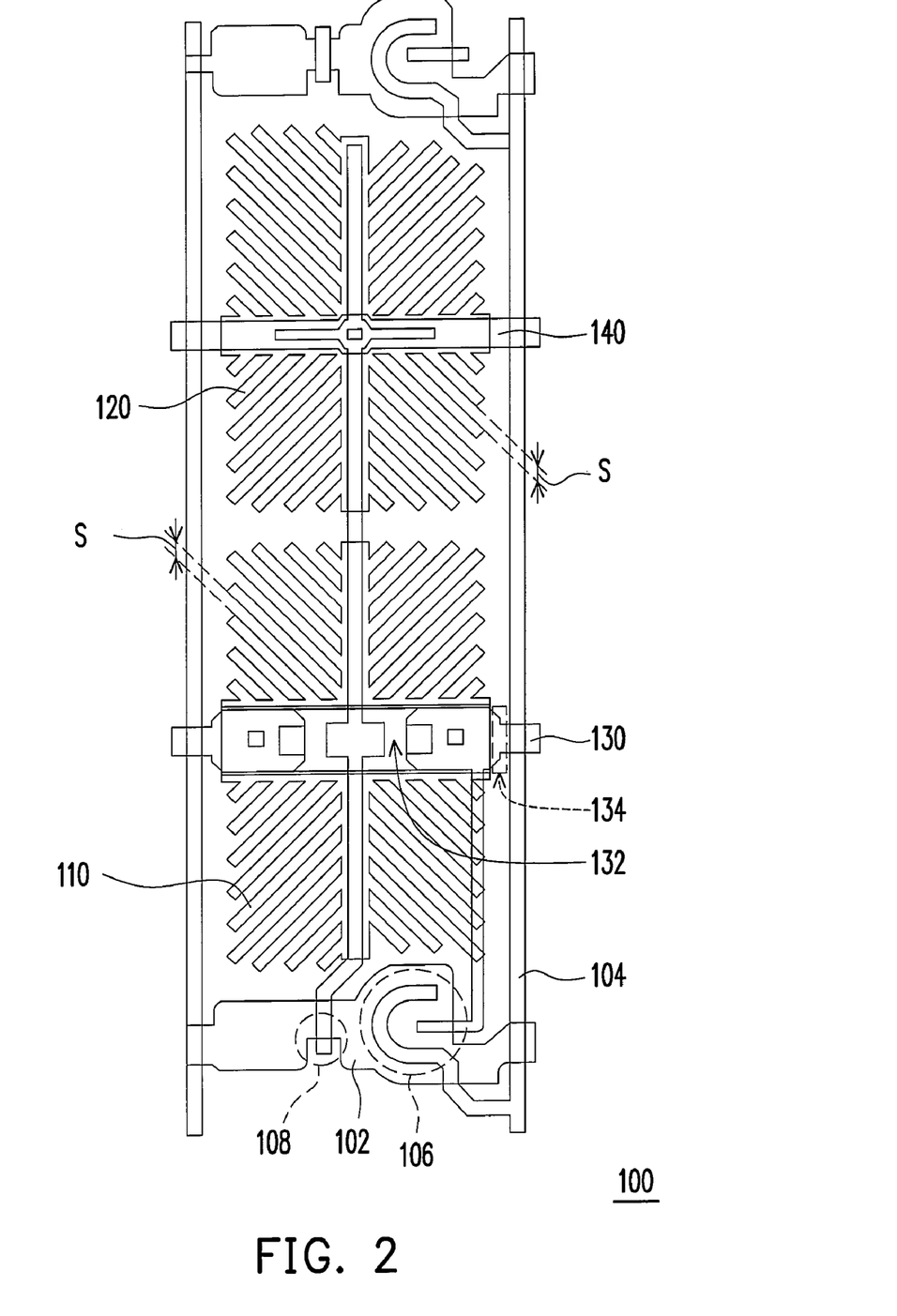
FIG. 2 illustrates a comparison reference of the pixel structure applied to the PSA LCD panel.

FIG. 2 illustrates a comparison reference of the pixel structure applied to the PSA LCD panel. Referring to FIG. 2, a pixel structure 100 electrically connecting a scan line 102 and a data line 104 includes a first active device 106, a second active device 108, a first pixel electrode 110, a second pixel electrode 120, a first capacitance lower electrode 130, and a second capacitance lower electrode 140. The first pixel electrode 110 and the second pixel electrode 120 are electrically connected to the first active device 106 and the second active device 108, respectively. The first capacitance lower electrode 130 and the second capacitance lower electrode 140 are respectively located below the first pixel electrode 110 and the second pixel electrode 120. The first capacitance lower electrode 130 can be divided into a first region 132 shielded by the first pixel electrode 110 and a plurality of second regions 134 uncovered by the first pixel electrode 110. Besides, the first pixel electrode 110 and the second pixel electrode 120 respectively have a plurality of fine slits S.

Referring to FIGS. 1B and 2, the pixel structure 100 is disposed on the array substrate 20, and the PSA process is performed thereon. In this step, the first voltage is inputted into the first capacitance lower electrode 130 and the second capacitance lower electrode 140, for example. The first pixel electrode 110 and the second pixel electrode 120 are respectively coupled to the first capacitance lower electrode 130 and the second capacitance lower electrode 140, so as to generate a coupling voltage. At this time, the fine slits S pose an impact on the electric field in the liquid crystal layer 40, and thus the liquid crystal molecules 42 are arranged in a direction of the fine slits S, so as to accomplish a favorable alignment effect.

However, in the PSA process, another electric field is generated between the opposite electrode 32 and the second regions 134 of the first capacitance lower electrode 130 uncovered by the first pixel electrode 110. Hence, the liquid crystal molecules 42 may also be arranged with respect to the center of the unexpected electric field. Thereby, during the formation of the stabilizing layer 46, the liquid crystal molecules 42 adjacent to the first capacitance lower electrode 130 are not able to be aligned in an ideal direction, thus giving rise to an adverse impact on the alignment of the pixel structure 100. Particularly, the larger the area occupied by the plurality of the second regions 134, the more the alignment of the pixel structure 100 is affected. To prevent the aforesaid situation, the present invention has proposed the following pixel structures; however, the following embodiments are not to limit the scope of the present invention.

First Embodiment

Figure 3A:
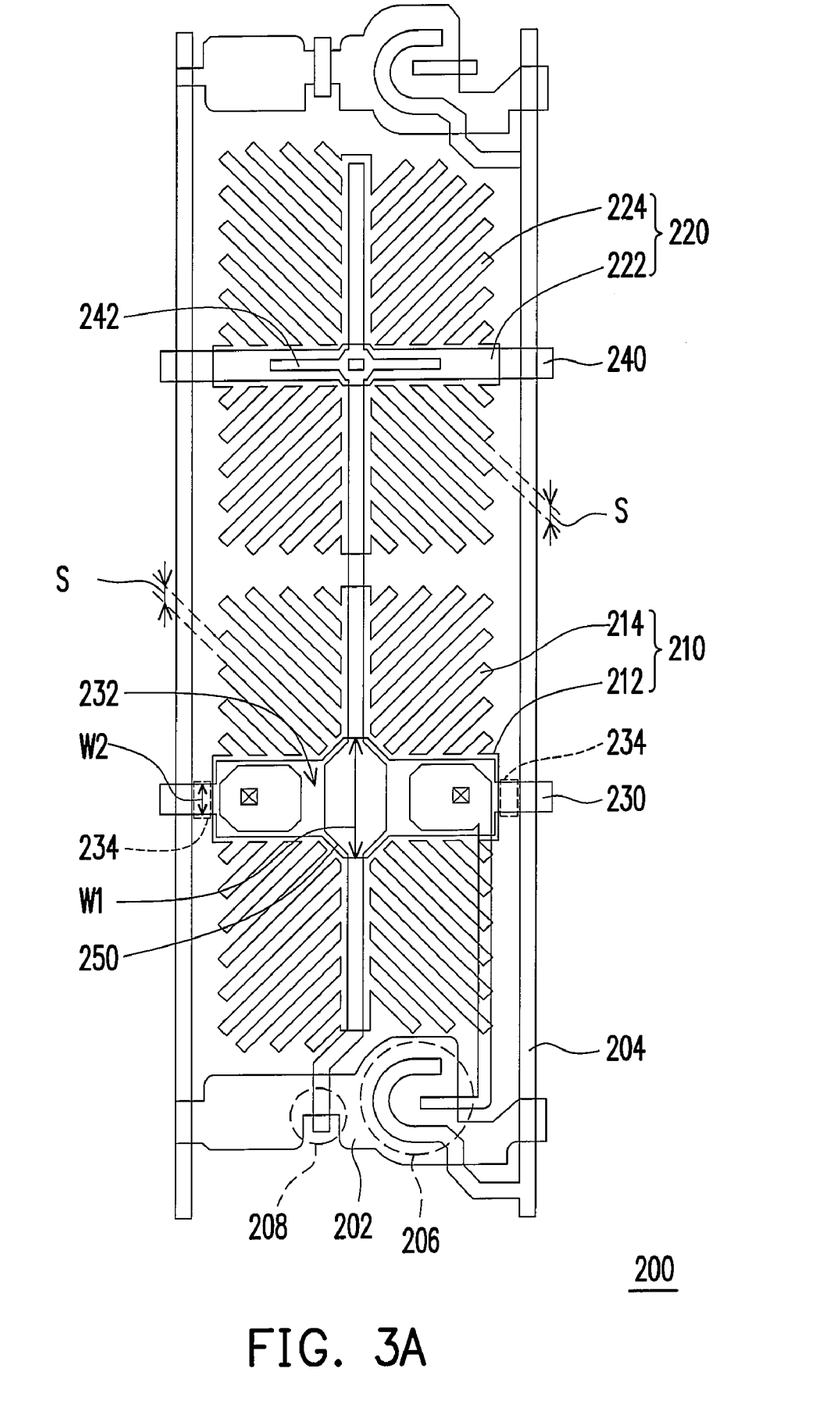
FIG. 3A is the pixel structure according to a first embodiment of the present invention.

FIG. 3A is the pixel structure according to a first embodiment of the present invention. Referring to FIG. 3A, a pixel structure 200 electrically connects a an line 202 and a data line 204 and includes a first active device 206, a second active device 208, a first pixel electrode 210 electrically connecting the first active device 206, a second pixel electrode 220 electrically connecting the second active device 208 and a first capacitance lower electrode 230. Both the first active device 206 and the second active device 208 electrically connect the scan line 202 and the data line 204. As the pixel structure 200 is applied to the LCD panel 10B illustrated in FIG. 1B, the pixel array 22 can be formed by arranging a plurality of the pixel structures 200 on the array substrate 20.

The first pixel electrode 210 has a first interlacing pattern 212 and a plurality of first stripe patterns 214 connected to the first interlacing pattern 212. The second pixel electrode 220 has a second interlacing pattern 222 and a plurality of second stripe patterns 224 connected to the second interlacing pattern 222. The first capacitance lower electrode 230 located under the first interlacing pattern 212 has a first region 232 and a plurality of second regions 234. In the present embodiment, two of the second regions 234 are taken for elaborating the present invention, while more of the second regions 234 can be formed upon the actual design demands or the manufacturing requirements. The present invention does not restrict the number of the second regions 234. The first pixel electrode 210 shields the first region 232 but does not shield the second regions 234.

Specifically, the first pixel electrode 210 further includes a plurality of the fine slits S disposed between the first interlacing pattern 212 and the first stripe patterns 214. One end of each of the fine slits S connects the first interlacing pattern 212, whereas the other end thereof is away from the first interlacing pattern 212. Likewise, the second pixel electrode 220 further includes a plurality of the fine slits S disposed between the second interlacing pattern 222 and the second stripe patterns 224. One end of each of the fine slits S connects the second interlacing pattern 222, whereas the other end thereof is away from the second interlacing pattern 222.

In the present embodiment, besides the first pixel electrode 210, the data line 204 further overlaps a portion of the first capacitance lower electrode 230, and therefore the first capacitance lower electrode 230 is significantly covered by other conductive layers. The first capacitance lower electrode 230 uncovered by other conductive layers then constructs the second regions 234. Namely, the second regions 234 do not overlap the data line 204. In the pixel structure 200, an area ratio of the first region 232 to the second regions 234 is approximately 10:1~300:1, preferably 40:1~50:1, wherein the area of the second regions 234 refers to the total area occupied by all of the second regions 234 in the pixel structure 200. On the other hand, a ratio of a maximum width w1 of the first region 232 to a maximum width w2 of each of the second regions 234 is approximately greater than 1:1 but less than 50:1 in a direction perpendicular to an extending direction of the first capacitance lower electrode 230, preferably in a range of 1.01:1~50:1.

In the pixel structure 100 of FIG. 2, the area ratio of the first region 132 to the plurality of the second regions 134 is approximately less than 10:1. In comparison with the pixel structure 100 illustrated in FIG. 2, less area is occupied by the second regions 234 in the pixel structure 200 of the present embodiment. Accordingly, as the pixel structure 200 and the pixel structure 100 have the same dimension and are both applied to the PSA process depicted in FIG. 1B, the electric field between the second regions 234 and the opposite electrode 32 in the pixel structure 200 affects the liquid crystal molecules 42 to a less extent. The liquid crystal molecules 42 are not apt to be arranged with respect to the second regions 234 as the center, and thus no node is generated in the second regions 234. In other words, the liquid crystal molecules 42 can be tilted and aligned in the ideal direction, i.e. the extending direction of the fine slits S, so as to achieve a satisfactory alignment effect. Therefore, the pixel structure 200 of the present embodiment is conducive to increasing yield of the PSA process and to further improving the display quality of the LCD panel 10B.

In brief, the patterns of the first capacitance lower electrode 230 can be changed to improve yield of the PSA process. Thereby, the area occupied by the second regions 234 is reduced, or the first capacitance lower electrode 230 is shielded by the first pixel electrode 210 to a greater extent. The less the uncovered area of the first capacitance lower electrode 230 is, the more the stabilizing layer 46 is cured in the PSA process on ideal conditions. At this time, the quality of the LCD panel 10B can be further improved.

The pixel structure 200 can further include a first capacitance upper electrode 250 disposed between the first pixel electrode 210 and the first capacitance lower electrode 230. The first capacitance upper electrode 250 can be shaped as a shield, a rectangle, or in other irregular shapes, for example. What is more, the pixel structure 200 can further include a second capacitance lower electrode 240 disposed below the second interlacing pattern 222 and a second capacitance upper electrode 242 disposed between the second pixel electrode 220 and the second capacitance lower electrode 240. The operation of the capacitance between the first capacitance lower electrode 230 and the first capacitance upper electrode 250 and the operation of the capacitance between the second capacitance lower electrode 240 and the second capacitance upper electrode 242 are conducive to adjusting display voltages of the first pixel electrode 210 and the second pixel electrode 220. As the pixel structure 200 is applied to the LCD panel 10B, the LCD panel 10B achieves an enhanced display performance.

Figure 3B:
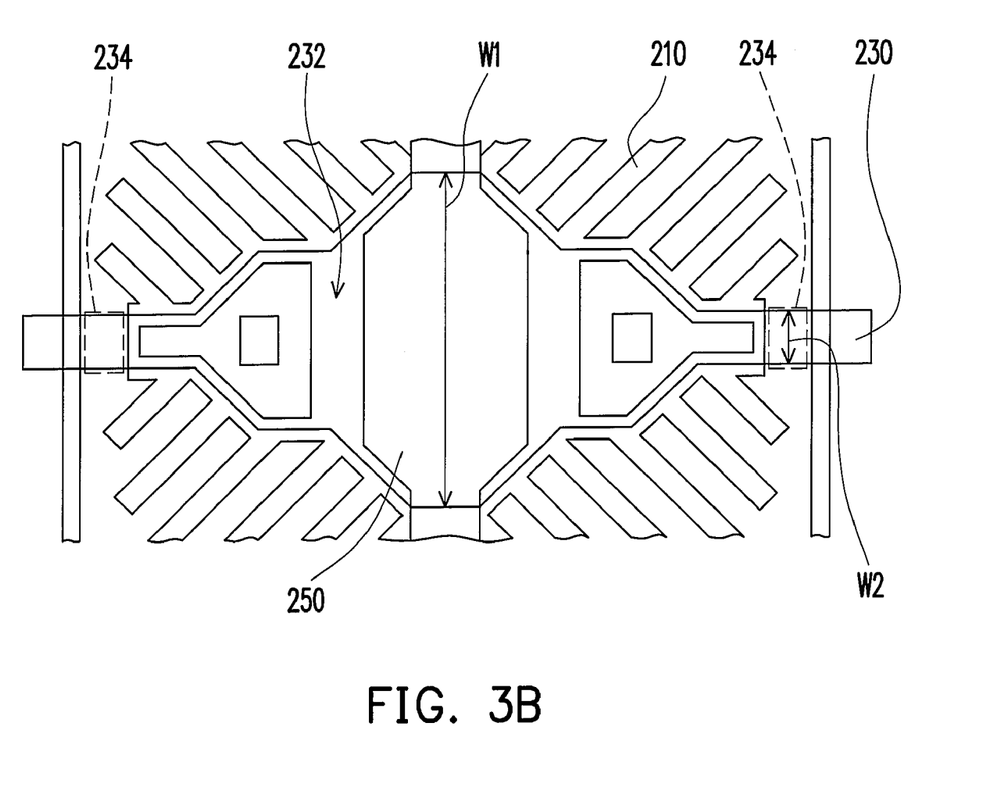
FIG. 3B illustrates a design of another first capacitance lower electrode in the pixel structure according to the first embodiment of the present invention.

The capacitance design of the pixel structure 200 is not limited to the pixel structure illustrated in FIG. 3A. FIG. 3B illustrates a design of another first capacitance lower electrode 230 in the pixel structure according to the first embodiment of the present invention. Referring to FIG. 3B, patterns of the first region 232 may gather toward the center of the first pixel electrode 210, so as to form a pattern nearly in the shield shape. The design of the first capacitance lower electrode 230 in the pixel structure 200 can surely have different patterns in an alternative based on other design demands. Here, when the area ratio of the first region 232 to the second regions 234 is in a range of 10:1~300:1 and/or the ratio of the maximum width w1 of the first region 232 to the maximum width w2 of each of the second regions 234 is greater than, 1.0:1 but less than 50:1 in a direction perpendicular to the extending direction of the first capacitance lower electrode 230, the liquid crystal molecules can be prevented from being tilted in an inappropriate manner. Preferably, the area ratio of the first region 232 to the second regions 234 is in a range of 40:1~50:1.

Second Embodiment

Figure 4A:
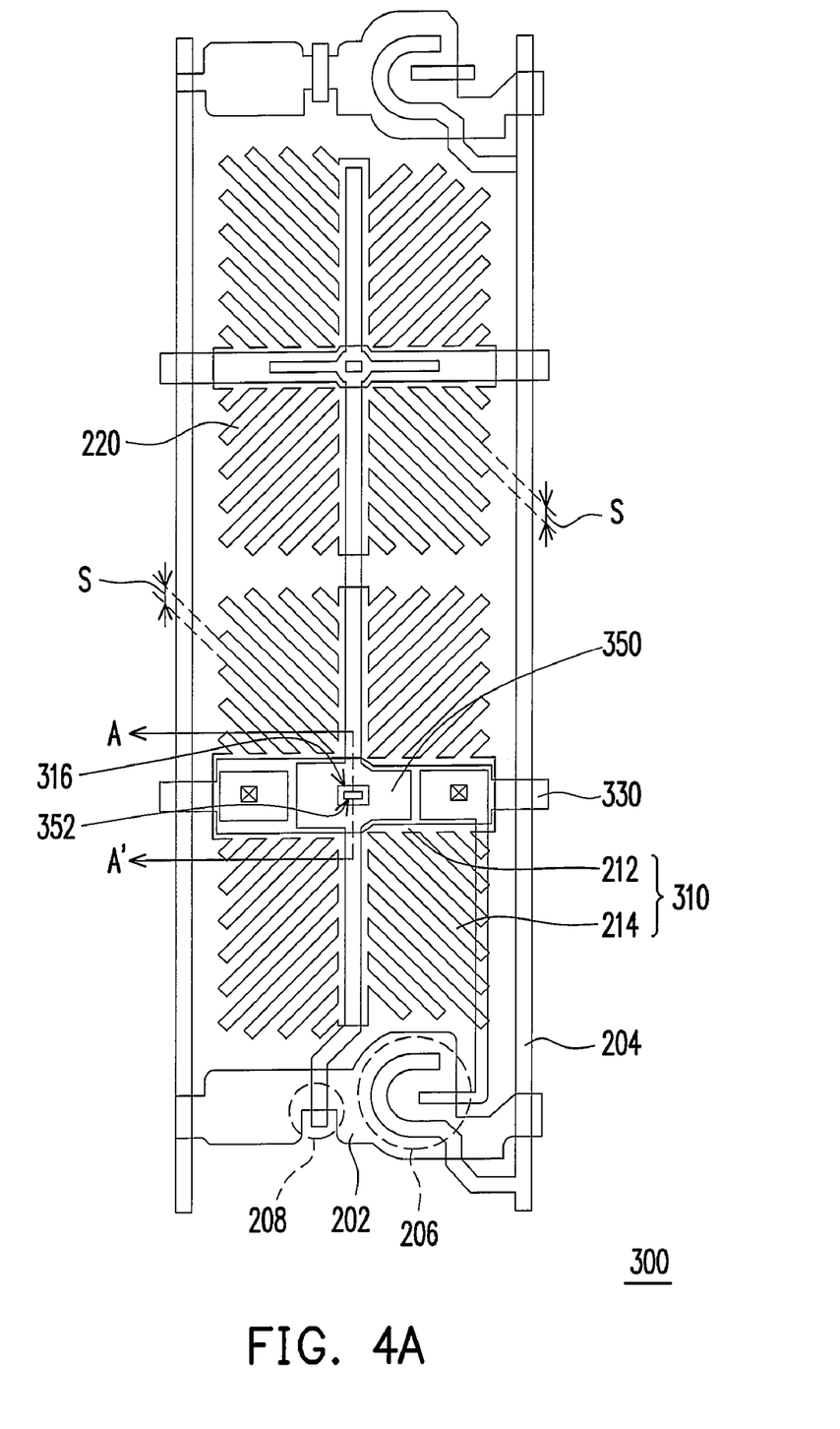
FIG. 4A is the pixel structure according to a second embodiment of the present invention.
Figure 4B:
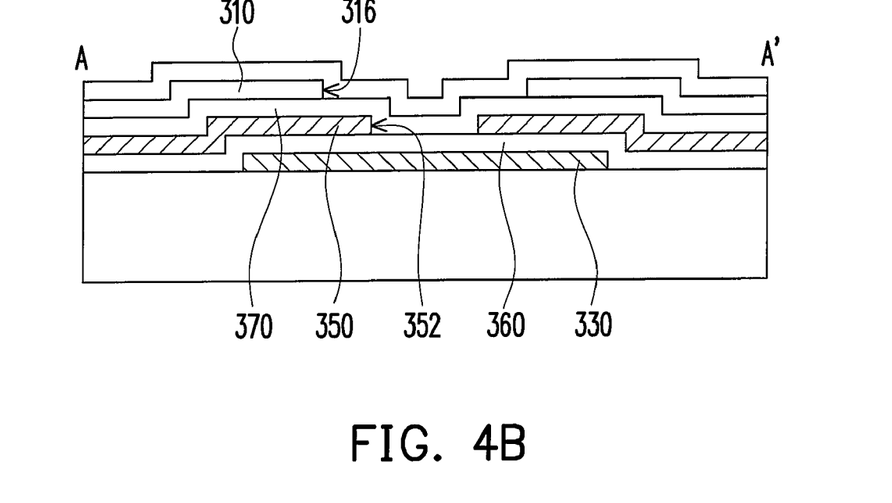
FIG. 4B is a cross-sectional view along a line A-A' depicted in FIG. 4A.

FIG. 4A is the pixel structure according to a second embodiment of the present invention. FIG. 4B is a cross-sectional view along a line A-A' depicted in FIG. 4A. Referring to FIGS. 4A and 4B, the design of a pixel structure 300 is similar to the design of the pixel structure 200, and thus identical elements are not further described hereinafter. The difference therebetween lies in that a first capacitance upper electrode 350 of the pixel structure 300 has a first opening 352, while a first pixel electrode 310 has a second opening 316. In addition, the pattern design of the first capacitance lower electrode 330 is slightly different from that in the pixel structure 200.

It is observed from the cross-sectional view that the pixel structure 300 further includes an insulating layer 360 and a dielectric layer 370. The insulating layer 360 is disposed between the first capacitance lower electrode 330 and the first capacitance upper electrode 350. The dielectric layer 370 is disposed between the first pixel electrode 310 and the first capacitance upper electrode 350. The first opening 352 is located below a center of the first interlacing pattern 212, so as to expose a portion of the insulating layer 360 above the first capacitance lower electrode 330. The second opening 316 at least overlaps the first opening 352 and exposes a portion of the dielectric layer 370 above the first capacitance lower electrode 330. Besides, the second opening 316 is, for example, greater than the first opening 352. The size and the shape of the first opening 352 and the second opening 316 are determined upon actual design demands or manufacturing requirements, and thus the present invention does not pose any limitation on said size or said shape.

The capacitance design in the present embodiment allows a portion of the first capacitance lower electrode 330 disposed below the center of the first pixel electrode 310 not to be covered by other conductive layers because of the disposition of the first opening 352 and the second opening 316. Hence, in the PSA process, the operation of the electric field between the opposite electrode and the first capacitance lower electrode 330 uncovered by the conductive layers results in an outward arrangement of the liquid crystal molecules with respect to the center of the first pixel electrode 310 as a node. In other words, the design of the pixel structure 300 permits the liquid crystal molecules to be tilted in an appropriate direction.

Figure 4C:
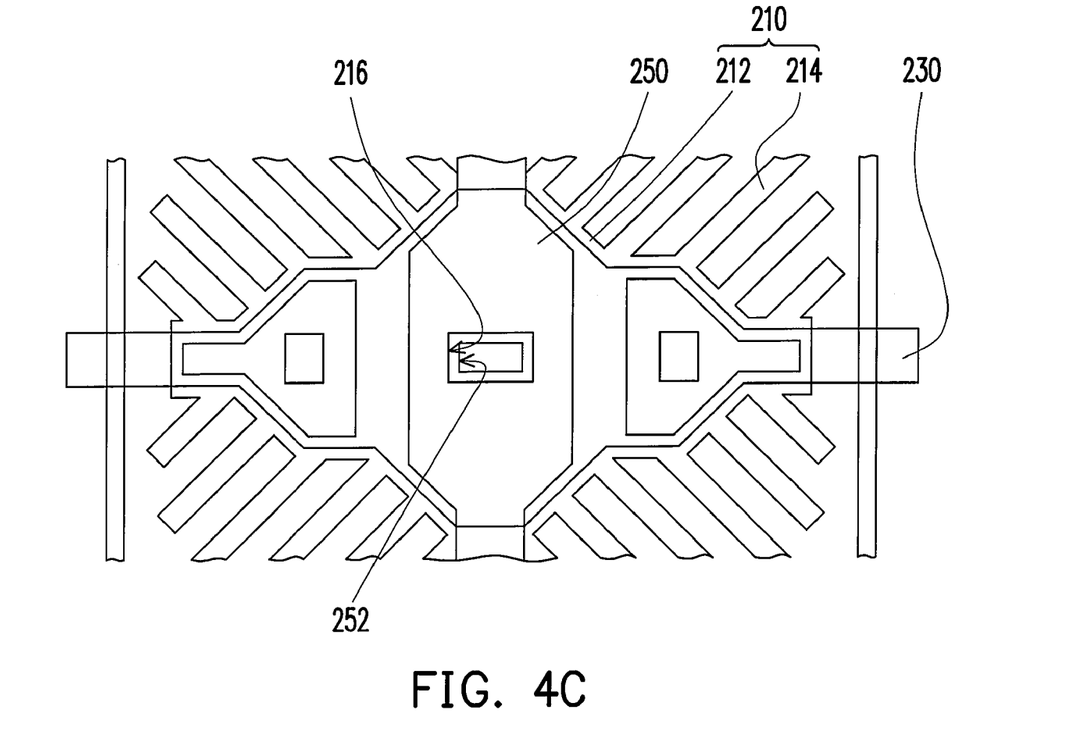
FIG. 4C illustrates a design of still another first capacitance lower electrode in the pixel structure according to the present invention.

Besides, when the first capacitance upper electrode 350 is not disposed in the pixel structure 300, the dielectric layer 370 located between the first pixel electrode 310 and the first capacitance lower electrode 330 can be otherwise disposed in the pixel structure 300. Here, the second opening 316 located at the center of the first pixel electrode 310 can still be disposed therein. Thereby, when the PSA process is implemented, the liquid crystal molecules can be arranged with respect to the center of the first pixel electrode 310 as the node, so as to accomplish the appropriate alignment. That is to say, without considering whether the first capacitance upper electrode 350 is disposed or not, the opening can still be formed in the conductive layer above the first capacitance lower electrode 330 according to the present invention, such that a portion of the first capacitance lower electrode 330 is not shielded. As such, yield of the PSA process and the quality of the LCD panel applying the pixel structure 300 are improved. It is of certainty that in other embodiments, the second capacitance lower electrode 240, the second capacitance upper electrode 242, and the second pixel electrode 220 can also be designed in the same manner as illustrated in FIG. 4A. Moreover, the first capacitance upper electrode 250 and the first pixel electrode 210 described in the first embodiment can also have the first opening 252 and the second opening 216 respectively as illustrated in FIG. 4C, so as to better arrange the alignment of the liquid crystal molecules in the LCD panel.

In light of the foregoing, through changing the patterns of the capacitance lower electrode in the pixel structure of the present invention, an area of the capacitance lower electrode uncovered by other conductive layers is reduced. Therefore, the pixel structure of the present invention is conducive to an arrangement of the liquid crystal molecules in an appropriate direction in the PSA process. On the other hand, the opening corresponding to the center of the first pixel electrode is further formed in the conductive layer above the first capacitance lower electrode in the pixel structure of the present invention. At this time, the first capacitance lower electrode located at the center of the first pixel electrode is not shielded by other conductive layers, such that the liquid crystal molecules can be tilted in the appropriate direction in the PSA process. To sum up, the pixel structure of the present invention is able to improve alignment process yield of the LCD panel and to further enhance the display effect of the LCD panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure electrically connecting a scan line and a data line, the pixel structure comprising:
   a first active device, electrically connecting the scan line and the data line;
   a second active device, electrically connecting the scan line and the data line;
   a first pixel electrode, electrically connecting the first active device, the first pixel electrode having a first interlacing pattern and a plurality of first stripe patterns connected to the first interlacing pattern;
   a second pixel electrode, electrically connecting the second active device, the second pixel electrode having a second interlacing pattern and a plurality of second stripe patterns connected to the second interlacing pattern; and
   a first capacitance lower electrode, located under the first interlacing pattern, the first capacitance lower electrode having a first region and a plurality of second regions, the first pixel electrode substantially shielding the first region but not shielding the second regions, wherein an area ratio of the first region to the second regions is approximately 10:1~300:1.

2. The pixel structure of claim 1, wherein the second regions do not overlap the data line.

3. The pixel structure of claim 1, wherein a ratio of a width of the first region to that of each of the second regions is greater than 1:1 but less than 50:1 in a direction perpendicular to an extending direction of the first capacitance lower electrode.

4. The pixel structure of claim 1, further comprising:
   a first capacitance upper electrode, disposed between the first pixel electrode and the first capacitance lower electrode; and
   an insulating layer, disposed between the first capacitance lower electrode and the first capacitance upper electrode.

5. The pixel structure of claim 4, further comprising a dielectric layer disposed between the first pixel electrode and the first capacitance upper electrode, wherein the first capacitance upper electrode has a first opening disposed below a center of the first interlacing pattern, so as to expose a portion of the insulating layer disposed above the first capacitance lower electrode, and wherein the first pixel electrode further has a second opening at least overlapping the first opening.

6. The pixel structure of claim 5, wherein the second opening is greater than the first opening.

7. The pixel structure of claim 1, further comprising a dielectric layer disposed between the first pixel electrode and the first capacitance lower electrode, wherein the first pixel electrode further has a second opening exposing a portion of the dielectric layer above the first region.

8. The pixel structure of claim 1, the first pixel electrode further comprising a plurality of fine slits disposed between the first interlacing pattern and the first stripe patterns, wherein one end of each of the fine slits connects the first interlacing pattern, but the other end thereof is away from the first interlacing pattern.

9. The pixel structure of claim 1, further comprising:
   a second capacitance lower electrode, disposed below the second interlacing pattern; and
   a second capacitance upper electrode, disposed between the second pixel electrode and the second capacitance lower electrode.

10. The pixel structure of claim 1, the second pixel electrode further comprising a plurality of fine slits disposed between the second interlacing pattern and the second stripe patterns, wherein one end of each of the fine slits connects the second interlacing pattern, but the other end thereof is away from the second interlacing pattern.

11. The pixel structure of claim 1, wherein the area ratio of the first region to the second regions is approximately 40:1~50:1.

12. A pixel structure electrically connecting a scan line and a data line, the pixel structure comprising:
   a first active device, electrically connecting the scan line and the data line;
   a second active device, electrically connecting the scan line and the data line;
   a first pixel electrode, electrically connecting the first active device, the first pixel electrode having a first interlacing pattern and a plurality of first stripe patterns connected to the first interlacing pattern;
   a second pixel electrode, electrically connecting the second active device, the second pixel electrode having a second interlacing pattern and a plurality of second stripe patterns connected to the second interlacing pattern;
   a first capacitance lower electrode, disposed below the first interlacing pattern;
   a first capacitance upper electrode, disposed between the first pixel electrode and the first capacitance lower electrode;
   an insulating layer, disposed between the first capacitance lower electrode and the first capacitance upper electrode; and
   a dielectric layer, disposed between the first capacitance upper electrode and the first pixel electrode, wherein the first capacitance upper electrode has a first opening located below a center of the first interlacing pattern, so as to expose a portion of the insulating layer above the first capacitance lower electrode.

13. The pixel structure of claim 12, wherein the first pixel electrode further has a second opening at least overlapping the first opening.

14. The pixel structure of claim 13, wherein the second opening is greater than the first opening.

15. The pixel structure of claim 12, the first pixel electrode further comprising a plurality of fine slits, disposed between the first interlacing pattern and the first stripe patterns, wherein one end of each of the fine slits connects the first interlacing pattern, but the other end thereof is away from the first interlacing pattern.

16. The pixel structure of claim 12, further comprising:
   a second capacitance lower electrode, disposed below the second interlacing pattern; and
   a second capacitance upper electrode, disposed between the second pixel electrode and the second capacitance lower electrode.

17. The pixel structure of claim 12, the second pixel electrode further comprising a plurality of fine slits disposed between the second interlacing pattern and the second stripe patterns, wherein one end of each of the fine slits connects the second interlacing pattern, but the other end thereof is away from the second interlacing pattern.

18. A pixel structure electrically connecting a scan line and a data line, the pixel structure comprising:
   a first active device, electrically connecting the scan line and the data line;
   a second active device, electrically connecting the scan line and the data line;
   a first pixel electrode, electrically connecting the first active device, the first pixel electrode having a first interlacing pattern and a plurality of first stripe patterns connected to the first interlacing pattern;
   a second pixel electrode, electrically connecting the second active device, the second pixel electrode having a second interlacing pattern and a plurality of second stripe patterns connected to the second interlacing pattern;
   a first capacitance lower electrode, disposed below the first interlacing pattern; and
   an insulating layer, disposed between the first capacitance lower electrode and the first pixel electrode, wherein the first pixel electrode further has an opening exposing a portion of the insulating layer above the first capacitance lower electrode.

19. A manufacturing method of a liquid crystal display (LCD) panel, the manufacturing method comprising:
   providing a semi-finished LCD panel which includes:
      an array substrate, comprising a plurality of the pixel structure electrically connecting a scan line and a data line, the pixel structure comprising:
         a first active device, electrically connecting the scan line and the data line;
         a second active device, electrically connecting the scan line and the data line;
         a first pixel electrode, electrically connecting the first active device, the first pixel electrode having a first interlacing pattern and a plurality of first stripe patterns connected to the first interlacing pattern;
         a second pixel electrode, electrically connecting the second active device, the second pixel electrode having a second interlacing pattern and a plurality of second stripe patterns connected to the second interlacing pattern;
         a first capacitance lower electrode, disposed below the first interlacing pattern;
         a first capacitance upper electrode, disposed between the first pixel electrode and the first capacitance lower electrode;
         an insulating layer, disposed between the first capacitance lower electrode and the first capacitance upper electrode; and
         a dielectric layer, disposed between the first capacitance upper electrode and the first pixel electrode, wherein the first capacitance upper electrode has a first opening located below a center of the first interlacing pattern, so as to expose a portion of the insulating layer above the first capacitance lower electrode;
      an opposite substrate, disposed opposite to the array substrate; and
      a liquid crystal layer, disposed between the array substrate and the opposite substrate, the liquid crystal layer comprising a plurality of monomers;
   generating a voltage difference between the array substrate and the opposite substrate; and
   polymerizing the monomers.

20. The manufacturing method of claim 19, wherein the step of generating the voltage difference between the array substrate and the opposite substrate includes:
   providing a ground level to the opposite substrate; and
   providing a first voltage to the first capacitance lower electrode, wherein the first voltage has a positive half-cycle signal and a negative half-cycle signal, and a peak value of the positive half-cycle signal and a peak value of the negative half-cycle signal have a difference in a range of 10V~100V.

21. The manufacturing method of claim 19, wherein the voltage difference is approximately 5V~50V.

* * * * *